United States Patent [19]

Mullane et al.

[11] Patent Number: 4,642,442

[45] Date of Patent: Feb. 10, 1987

[54] BATTERY INTERCELL CONNECTION BY INDUCTION HEATING

[75] Inventors: William E. Mullane, Warren, Ohio; David Lund, S. Minneapolis, Minn.

[73] Assignee: The Taylor-Winfield Corporation, Warren, Ohio

[21] Appl. No.: 788,642

[22] Filed: Oct. 17, 1985

[51] Int. Cl.⁴ .............................................. H05B 6/10
[52] U.S. Cl. .................................. 219/10.41; 219/9.5; 219/10.57; 219/10.71; 219/85 A; 29/623.1; 29/730
[58] Field of Search ................... 219/10.41, 10.43, 9.5, 219/10.49 R, 10.57, 10.67, 10.71, 10.73, 85 A; 29/623.1, 623.2, 623.4, 730, 731

[56] References Cited

U.S. PATENT DOCUMENTS

| | | | |
|---|---|---|---|
| 3,441,448 | 4/1969 | Hayward et al. | 29/623.2 |
| 3,544,754 | 12/1970 | Buttke et al. | 219/79 |
| 3,589,948 | 6/1971 | Adams | 29/623.1 |
| 3,767,889 | 10/1973 | Sano et al. | 29/623.1 X |
| 4,458,125 | 7/1984 | Leis | 219/10.73 X |
| 4,485,959 | 12/1984 | Orlando et al. | 29/623.1 X |
| 4,501,943 | 2/1985 | Lund | 219/10.43 |

*Primary Examiner*—Philip H. Leung
*Attorney, Agent, or Firm*—William J. Ruano

[57] ABSTRACT

A method of making intercell connections in a lead-acid storage battery. The battery has a plurality of pairs of vertical risers of lead or other readily feasible material, each pair sandwiching an electrically insulating vertical partition. The method comprises forming a horizontal hole in a partition, squeezing together such as by hydraulic cylinders, a pair of risers against its corresponding partition and applying coils energized by high frequency electrical current against the outer surfaces of the risers adjacent the hole and simultaneously squeezing together said pair of risers against its partition so as to fuse the riser material adjacent the hole and introduce it through and fill the hole. High quality readily reproducible intercell connections are thus formed successively throughout the battery.

19 Claims, 6 Drawing Figures

BATTERY INTERCELL CONNECTION BY INDUCTION HEATING

This invention relates to an apparatus and method for intercell fusion of lead/acid storage batteries and, more particularly, to "through-the-partition" type intercell construction, with "flat tombstone" style lead intercell connectors.

BACKGROUND OF THE INVENTION

In one method, known as "over-the-partition hand burning" (riser construction), vertical lead risers from cell elements which sandwich an intervening rubber or plastic partition are melted over the partition and fused manually, using a gas torch. A metal or ceramic mold is used to contain the molten lead. The fused, cooled lead forms the intercell connection.

In another method, known as "through-the-partition hand burning" (pin & ring construction), a lead pin extends horizontally from the lead tombstone of the positive strap of one cell element, through a round orifice in the intervening rubber or plastic partition, and into a horizontal round orifice (ring) in the lead tombstone of the negative strap of the element in the adjacent cell. The positive pin and negative ring are melted and fused manually, using a gas torch. A metal or ceramic mold is used to contain the molten lead. The fused, cooled lead forms the intercell connection.

In another method, known as "intercell reistance welding" (flat tombstone construction), vertical flat lead tombstones from the straps of elements in adjacent cells are positioned over a round orifice in the intervening rubber or plastic partition. Electrodes deform the tombstones until they make contact within the orifice in the partition. Current is then applied across the two tombstones; internal and contact resistance creates heat to melt and fuse the tombstones within the orifice in the partition. The fused, cooled lead forms the intercell connection.

In another method, known as "over-the-partition induction heated intercell fusion" (riser construction), vertical lead risers from cell elements adjacent to an intervening rubber or plastic partition are melted and fused using induction heat. A mold is used to contain the molten lead. The fused, cooled lead forms the intercell connection.

In another method, known as "through-the-partition induction heated intercell fusion" (pin & ring construction), a lead pin extends horizontally from the lead tombstone of the positive strap of one cell element, through a round orifice in the intervening rubber or plastic partition, and into a horizontal round orifice (ring) in the lead tombstone of the negative strap of the element in the adjacent cell. The positive pin and negative ring are melted and fused using induction heat. No mold is used to contain the molten lead. The fused, cooled lead forms the intercell connection.

Over-the-partition hand burning, and through-the-partition hand burning (both described above) are manual operations; thus, they are relatively slow and yield intercell connections of inconsistent and unreliable quality.

Intercell resistance welding (described above) has been automated and is relatively fast, but it produces intercell connections of inconsistent and unreliable quality.

Through-the-partition induction heated intercell with pin & ring construction (described above) requires male and female parts which are relatively difficult to cast as compared to flat tombstones.

The subject process, Intercell Fusion Through Battery Flat Tombstones, differs markedly from previously patented processes as described below.

U.S. Pat. No. 3,544,754, granted Dec. 1, 1970, to Buttke, et al., and related patents refer to a method and apparatus for fusing lead/acid battery intercell terminals using "extrusion fusion" and resistance welding. Vital to this process, is the principle of extruding lead through an orifice in the battery container partition. Since, in the present invention, insufficient external pressure is supplied to extrude the lead, and since induction heating (not resistance welding) is utilized, U.S. Pat. No. 3,544,754 does not apply.

U.S. Pat. No. 3,589,948, granted June 29, 1971, to Adams, refers to various techniques, including induction heating, used to fuse intercell connections (with flat tombstones) through an orifice in battery container partitions. This patent specifies the use of a "mold" to "contain" the molten lead. The present invention uses no molds to contain the molten lead; therefore, U.S. Pat. No. 3,589,948 does not apply.

U.S. Pat. No. 4,501,943, granted Feb. 26, 1985, to Lund, and U.S. Pat. No. 4,523,068, granted June 11, 1985 to Lund, et al., refer to a method and apparatus for fusing external battery top terminal posts. These patents specify the use of a "concentric mold" to contain the molten lead. Since the process detailed here refers to fusion of intercell connectors inside the battery, not external top terminal posts, and because molds are not used to contain the molten lead, U.S. Pat. Nos. 4,501,943 and 4,523,068 do not apply.

U.S. Pat. No. 3,336,164, granted Aug. 15, 1967 to Miller, and related patents, refer to method and apparatus for fusing internal intercell connections with pin & ring construction using manual gas torch "burning". Since the process detailed in applicants invention employs flat tombstones (not male and female "pin & ring" tombstones), U.S. Pat. No. 3,336,164 does not apply.

SUMMARY OF THE INVENTION

An object of the present invention is to overcome the above-named disadvantages by providing induction heat to be used to produce intercell connections of uniformly high quality in lead/acid storage batteries with "through-the-partition" type construction using "flat tombstone" lead intercell connectors.

Another object of the present invention is to automatically, rapidly and reliably fuse the series electrical connections between adjacent cell elements in a lead/acid storage battery, constructed with "flat tombstone" type "through-the-partition" intercell connections to achieve high production rates of 3 to 4 batteries per minute—or in smaller semi-automatic devices, 1 to 2 batteries per minute.

Other objects and advantages will become apparent from a study of the following description taken with the accompanying drawings wherein:

DESCRIPTION OF THE PREFERRED EMBODIMENT

Figure 1:
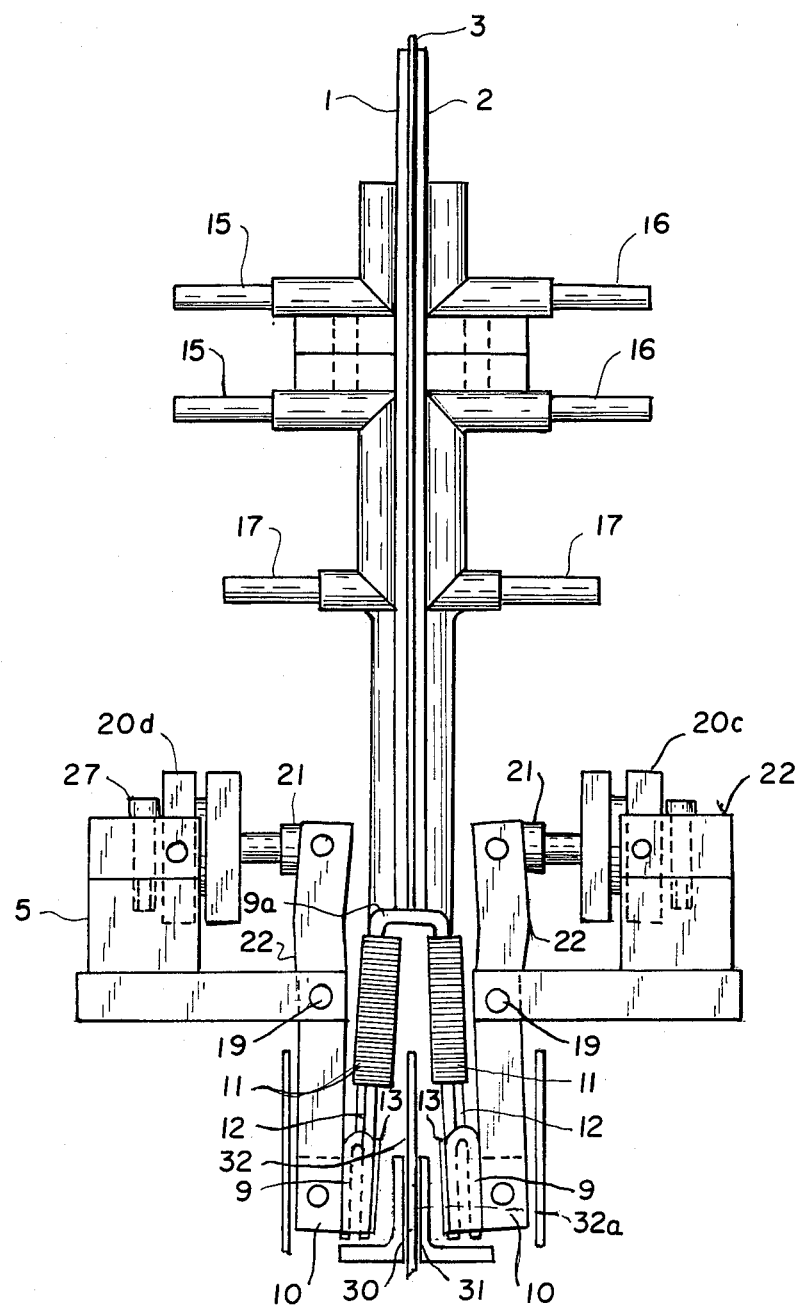
FIG. 1 is an elevational view of a fusing apparatus embodying the present invention.
Figure 2:
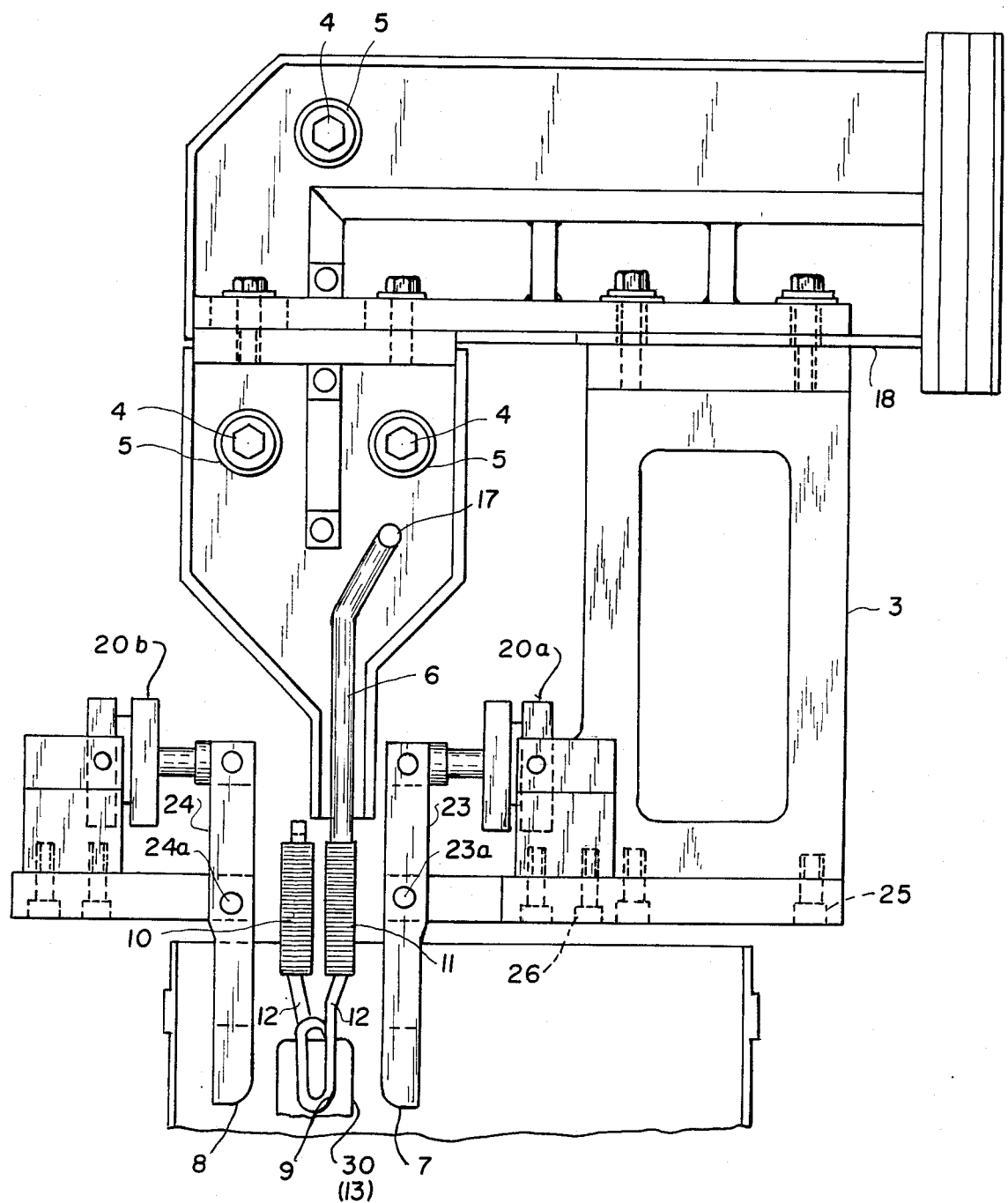
FIG. 2 is a side view thereof.

Referring more particularly to FIGS. 1 and 2, they show a fusing device comprising flat terminals 1 and 2 of copper or other suitable electrical conducting material, having sandwiched therebetween, electrical insulator 3. This assembly is clamped together by a plurality of bolts 4, electrically insulated from the terminals by insulator rings 5. Metal tubes 6, one on each side of the device, which are of copper or other electrical conducting material, are connected at their lower ends, to hoses 10, 11 which are, in turn, connected to electrical conducting tubes 12, 12 whose lower terminals are integrally connected to the ends of a tubular induction coil 9 of electrical conducting material, such as copper. Coil 9 preferably has two or more turns which are fitted into a correspondingly-shaped opening or pocket in refractory insulator 10, together with mica strip 13. Cooling water is forced through tubes 6 and coil 9, also flows through hoses (not shown) bridging 15, 15, 16, 16 and 17, 17 from generator to buss bar 18.

Figure 5:
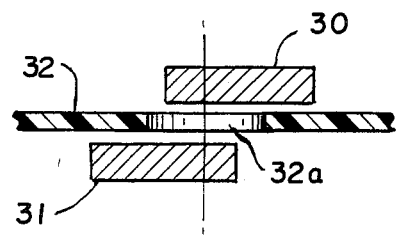
FIG. 5 and FIG. 6 are horizontal sectional views showing positions before and after alignment of the terminals.
Figure 6:
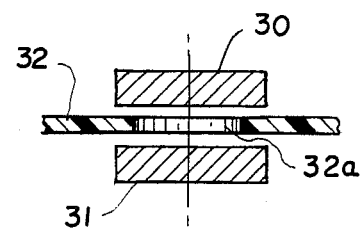

In operation, referring to FIG. 2, fluid-actuated cylinders 20a, 20b are activated, pivoting levers 23 and 24 about pivots 23a and 24a, pressing fingers 7, 8 thereof against the edges of the vertical lead tombstones 30, 31 in each of two adjacent cells in the battery. Such action moves the tombstones 30, 31 and their corresponding cell element straps 30a, 31a from the position shown in FIG. 5 to that shown in FIG. 6 such that the vertical centerline of both tombstones 30, 31 are aligned on the centerline of the orifice 32a in the intervening plastic or rubber partition 32 in the battery, thus assuring proper pre-fusion horizontal alignment, as shown in FIG. 6.

While holding proper horizontal alignment, as described above and referring to FIG. 1, cylinders 20c, 20d (FIG. 1), which are at right angles to cylinders 20a and 20b are activated, drawing piston rod 21 inwardly, pivoting levers 22 about pivots 19, pressing insulating pads 10, 10 and corresponding induction heating coils 9, 9 against the flat faces of the tombstones 30, 31. Light pressure is applied to maintain alignment, as described above. Cylinders 20a, 20b may or may not be deactivated at this point.

The fusing device shown in FIGS. 1 and 2 may be used to fuse intercell connections such as described hereinafter.

Figure 3:
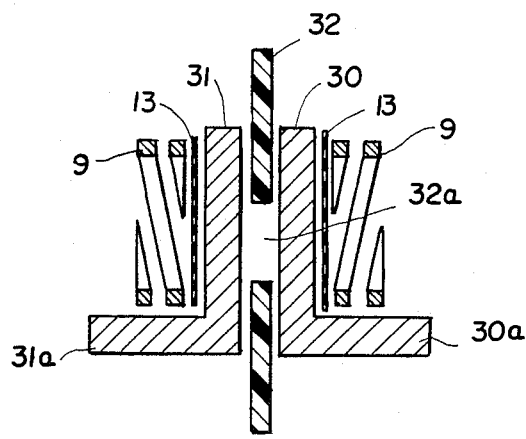
FIG. 3 is an enlarged sectional view showing a pair of terminals and associated parts.
Figure 4:
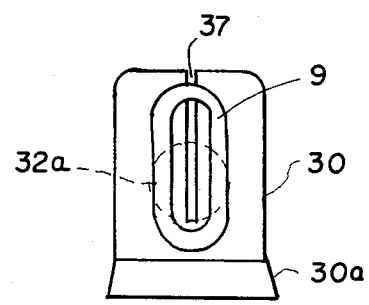
FIG. 4 is a side view of FIG. 3.

FIGS. 3 and 4 show a pair of tombstones 30, 31 having integral straps 30a and 31a, respectively, which are of lead or other suitable material which can be melted under relatively low heat. Partition 32, of polypropylene or other suitable electrically insulating material, is provided with a hole 32a which is to be filled by molten lead coming from tombstones 30, 31. More specifically, a pair of induction coils 9, 9 each having about two turns, which coils are connected in series by tube 9a(- FIG. 1), are applied alongside both of the tombstones, 31 and 32, preferably above the hole 32a (FIG. 4) so as to provide a heat zone in the oval portion of the tombstones 30, 31 just above the hole 32a. Mica strips 13, 13 are mounted between coils 9, 9 and tombstones 30, 31. Such mica strips also assist in serving as barriers to confine the molten portions of tombstones 30, 31. The fusion device shown in FIG. 1 may be applied so as to squeeze together tombstones 30, 31 and apply induction heat through coils 9. Such coils 9, 9 are energized by high frequency alternating current of the order of 450 KHZ or other suitable value, to provide induction heating to any inductive object(s) between them. This will avoid the necessity of using a surrounding mold since the unmelted sides of the tombstones 30, 31 confine the molten lead.

To minimize or prevent molten lead to be boiled up and out of the fusion zone and running down, the tombstones are preferably provided with saw cuts or slits, such as 37 shown in FIG. 4, which extend above and slightly below the position of the hole 32a of the insulating partition 32. The saw cuts may be of any desired shape, such as a "U" shaped groove or "V" notch on the inner surface or slits going through the entire thickness of the tombstones.

In operation, after the A.C. induction current is applied to coil turns 9 and 9, and at the same time as the tombstones and mica strips are being squeezed by two arms of the fusing device, then, upon application of induction A.C. current, lead of the tombstones will melt in the vicinity of the orifice 32a in the partition, thereby allowing molten lead to fill the partition orifice 32a from the molten lead obtained from the tombstones.

While FIGS. 1 to 4 show the use of two induction coils, 9, 9, in some instances only, a single coil may be used—although not as effective, and while FIG. 2 shows a self-aligning jaw mechanism to assure confrontation of the riser portions and central hole 32a, this may be done by hand instead of by fluid operated pivoted fingers 7 and 8.

Thus it will be seen that we have provided an efficient, rapid, quick and consistently reliable method and apparatus for joining together flat tombstones by "through-the-partition" inter-connection which lends itself to mass production methods.

While we have illustrated and described a single specific embodiment of our invention, it will be understood that this is by way of illustration only and that various changes and modifications may be contemplated in our invention within the scope of the following claims.

We claim:

1. In a storage battery having a plurality of pairs of terminals of readily fusible material, each pair of terminals having integral vertical riser portions having opposing flat surfaces, said riser portions sandwiching an electrical insulating vertical partition having a horizontal hole therethrough, each terminal also having a horizontal strap portion extending away from said partition and integral vertical riser portions; the method of making an intercell connection between each pair of terminals through the horizontal hole of the corresponding vertical partition, comprising applying a vertical insulating sheet against the outside of each of said vertical riser portions and applying an electrical induction coil adjacent the outside each of said sheets substantially concentric with said horizontal hole, squeezing together said sheets, pair of terminals and partition, and applying high frequency electrical current to said coils sufficiently as to partially fuse said riser portions in the vicinity of said horizontal hole of said partition and to fill said horizontal hole with fused metal of said riser portions, using said sheets, partition and vertical riser portions as dams to contain the fused metal, and thereafter allowing said fused metal to cool and solidify so as to form a metallic connection between said pair of terminals.

2. The method recited in claim 1 wherein said riser portions are initially laterally offset and thereafter moved edgewise along their major planes until said horizontal holes are in confronting concentric relationship.

3. The method recited in claim 2 wherein said edgewise movement is effected by a pair of fluid-actuated cylinders disposed at right angles to a second pair of fluid-actuated cylinders, the latter effecting squeezing together each pair of riser portions and sandwiched insulating vertical partition.

4. The method recited in claim 1 wherein vertical slits are formed in the inner surfaces of said pair of riser portions, portions of which confront said horizontal hole to prevent boiling over of the fused riser metal.

5. The method recited in claim 4 wherein said slits extend between the bottom of said hole to above the top thereof.

6. The method recited in claim 4 wherein said slits are of U-shaped cross-section.

7. The method recited in claim 4 wherein said slits are of V cross-section.

8. The method recited in claim 1 wherein power-operated means are provided for squeezing together said pair of riser portions.

9. The method recited in claim 8 wherein said power-operated means are a pair of fluid-operated cylinders.

10. The method recited in claim 9 wherein said power-operated means are hydraulic cylinders.

11. The method recited in claim 8 wherein said power-operated means is a fusion apparatus having a pair of pivotally mounted arms operated by fluid-operated cylinders, each arm carrying an induction coil and one of said insulating sheets to serve as a dam to restrain fused metal.

12. The method recited in claim 1 wherein the center of said induction coil is higher than that of said hole.

13. In a storage battery having a plurality of pairs of terminals of readily fusible material, each pair of terminals having integral vertical riser portions having opposing flat surfaces, said riser portions sandwiching an electrical insulating vertical partition having a horizontal hole therethrough, each terminal also having a horizontal strap portion extending away from said partition and integral vertical riser portions, a fusion device for making an intercell connection between said pair of terminals through the horizontal hole of the corresponding vertical partition, said fusion device comprising: means for applying a vertical insulating sheet against the outside surface of each of said vertical riser portions and applying an electrical induction coil adjacent the outside of each of said sheets substantially concentric with said horizontal hole, and means for squeezing together said sheets, pair of terminals and partition and applying high frequency electric current to said coils sufficiently as to partially fuse said flat riser portions in the vicinity of said horizontal hole of said partition to fill said hole with fused metal of said flat riser portions, using said sheets, partition and vertical riser portions as dams to contain the fused metal.

14. Apparatus as recited in claim 13 wherein vertical slits are formed in the inner surfaces of said pair of riser portions, portions of which confront said horizontal hole to prevent boiling over of the fused riser metal.

15. Apparatus as recited in claim 14 wherein said slits extend between the bottom of said hole to above the top thereof.

16. Apparatus as recited in claim 14 wherein said slits are of U-shaped cross-section.

17. Apparatus as recited in claim 14 wherein said slits are of V cross-section.

18. Apparatus as recited in claim 14 wherein power-operated means are provided for squeezing together said pair of riser portions.

19. Apparatus as recited in claim 13 wherein said vertical insulating sheets are of mica.

* * * * *